United States Patent
Fitt et al.

(10) Patent No.: US 12,281,798 B2
(45) Date of Patent: Apr. 22, 2025

(54) VENT COVER FOR AN OVEN APPLIANCE HAVING A TROUGH FOR CONDENSATION COLLECTION

(71) Applicant: Haier US Appliance Solutions, Inc., Wilmington, DE (US)

(72) Inventors: Tyler Fitt, Louisville, KY (US); Justin Patrick Todd, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 360 days.

(21) Appl. No.: 17/340,518

(22) Filed: Jun. 7, 2021

(65) Prior Publication Data
US 2022/0390123 A1 Dec. 8, 2022

(51) Int. Cl.
| | | |
|---|---|---|
| F24C 15/20 | (2006.01) | |
| F24C 15/14 | (2006.01) | |
| A47J 36/38 | (2006.01) | |
| F24C 15/32 | (2006.01) | |
| F24C 15/36 | (2006.01) | |

(52) U.S. Cl.
CPC .......... *F24C 15/2007* (2013.01); *F24C 15/14* (2013.01); *A47J 36/38* (2013.01); *F24C 15/20* (2013.01); *F24C 15/2042* (2013.01); *F24C 15/32* (2013.01); *F24C 15/36* (2013.01)

(58) Field of Classification Search
CPC ...... F24C 15/14; F24C 15/2007; F24C 15/20; F24C 15/2042; F24C 15/32; F24C 15/36; A47J 36/38
USPC ....................................................... 126/21 R
See application file for complete search history.

(56) References Cited

U.S. PATENT DOCUMENTS

| | | | | |
|---|---|---|---|---|
| 3,792,698 A | * | 2/1974 | Pottinger | F24C 15/2007 126/299 E |
| 3,832,988 A | * | 9/1974 | Doner | F24C 15/2007 126/39 J |
| 6,362,458 B1 | * | 3/2002 | Sargunam | F24C 15/14 219/400 |

(Continued)

FOREIGN PATENT DOCUMENTS

| | | | |
|---|---|---|---|
| CN | 211372496 U | | 8/2020 |
| SU | 730946 A | * | 4/1980 |
| WO | WO-0056194 A1 | * | 9/2000 ............. A47J 36/38 |

OTHER PUBLICATIONS

SU 730946 A—Translation (Year: 1980).*

*Primary Examiner* — Gregory A Wilson
*Assistant Examiner* — Benjamin W Johnson
(74) *Attorney, Agent, or Firm* — Dority & Manning, P.A.

(57) ABSTRACT

An oven appliance having a cabinet with a chamber positioned within the cabinet. The chamber is configured for receipt of a food item for cooking. The oven appliance also includes a door for providing selective access to the chamber and a plurality of walls including a top wall, a bottom wall, a back wall, a front wall, and opposing sidewalls defining the chamber. Further, the oven appliance includes a heating element for heating and cooking the food item. Moreover, the oven appliance includes a vent assembly for directing airflow from within the chamber outside of the chamber. The vent assembly includes a vent and a vent cover arranged atop the vent. The vent cover includes a body defining a cover portion and at least one flange. The flange(s) defines at least one trough for collecting condensed liquid therein.

16 Claims, 6 Drawing Sheets

(56) References Cited

U.S. PATENT DOCUMENTS

| | | |
|---|---|---|
| 10,288,298 B2 | 5/2019 | Chadwick |
| 10,443,858 B2 | 10/2019 | Stokes |
| 10,495,320 B2 | 12/2019 | Bierbaum |
| 2019/0011134 A1 | 1/2019 | Ceylan |

* cited by examiner

VENT COVER FOR AN OVEN APPLIANCE HAVING A TROUGH FOR CONDENSATION COLLECTION

FIELD OF THE INVENTION

The present disclosure relates generally to oven appliances and more particularly to an oven appliance having a vent cover with a flange having a trough for collecting condensed water near the oven vent.

BACKGROUND OF THE INVENTION

Oven appliances generally include a cabinet with a cooking chamber positioned therein. The cooking chamber is configured for receipt of food articles for cooking. The oven appliance also includes a heating element for generating heat energy for cooking. The heating element can be, e.g., an electric resistance element or a gas burner. Certain oven appliances also include features for forcing movement of heated air within the cooking chamber. Such oven appliances are generally referred to as convection ovens.

When cooking foods that exhaust steam or generate high humidity, water can condense in areas of concern or collect on visible surfaces within conventional oven appliances. For example, in certain instances, water may condense within the appliance and drip onto harnesses, controls, and/or connectors. To address this issue, certain oven appliances may include a vent having an increased height to reduce the likelihood of the exhaust cooling and condensing. Still other oven appliances include a cover over sensitive areas, such as the harnesses, controls, and/or connectors, which reroute the water to a desired location.

Accordingly, an improved oven appliance that addresses the aforementioned issues would be welcomed in the art. Thus, the present disclosure is directed to a flange of the vent cover of the vent having a trough that collects condensed water near the vent.

BRIEF DESCRIPTION OF THE INVENTION

Aspects and advantages of the invention will be set forth in part in the following description, or may be obvious from the description, or may be learned through practice of the invention.

In one aspect, the present disclosure is directed to an oven appliance having a cabinet with a chamber positioned within the cabinet. The chamber is configured for receipt of a food item for cooking. The oven appliance also includes a door for providing selective access to the chamber and a plurality of walls including a top wall, a bottom wall, a back wall, a front wall, and opposing sidewalls defining the chamber. Further, the oven appliance includes a heating element for heating and cooking the food item. Moreover, the oven appliance includes a vent assembly for directing airflow from within the chamber outside of the chamber. The vent assembly includes a vent and a vent cover arranged atop the vent. The vent cover includes a body defining a cover portion and at least one flange. The flange(s) defines at least one trough for collecting condensed liquid therein.

In another aspect, the present disclosure is directed to a vent assembly for an oven appliance. The vent assembly includes a vent for directing airflow from within a chamber of the oven appliance outside of the chamber. Further, the vent assembly includes a spill guard arranged above the vent. Moreover, the vent assembly includes a vent cover arranged atop the vent and the spill guard and at least partially covering the spill guard. In addition, the vent cover includes a body defining a cover portion and at least one flange. The flange(s) defines at least one trough for collecting condensed liquid therein.

These and other features, aspects and advantages of the present invention will become better understood with reference to the following description and appended claims. The accompanying drawings, which are incorporated in and constitute a part of this specification, illustrate exemplary embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
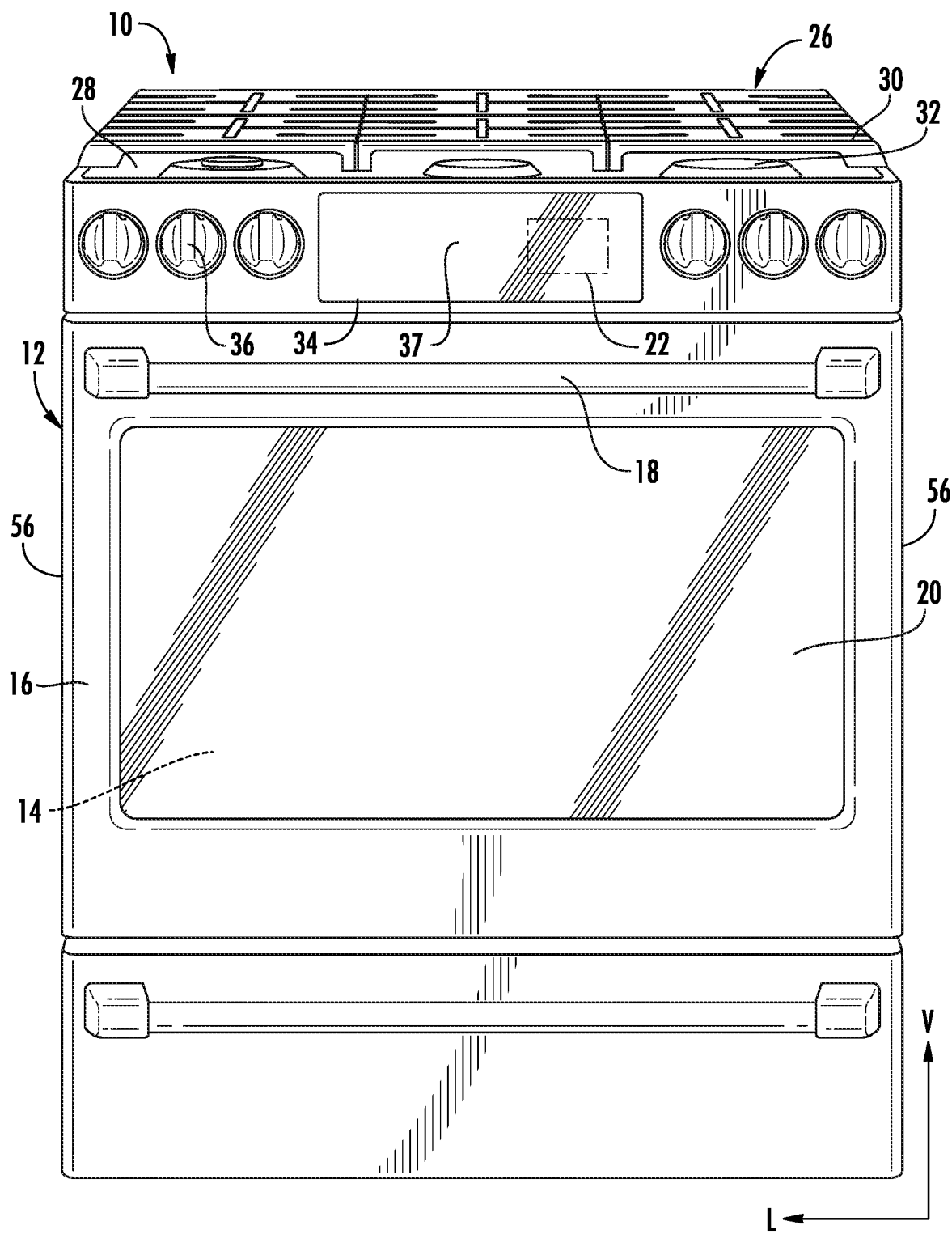
FIG. 1 provides a front view of an oven appliance having a door assembly in a closed position according to exemplary embodiments of the present disclosure.

Reference now will be made in detail to exemplary embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Referring now to the figures, FIG. 1 illustrates a perspective view of a cooking appliance, such as an oven appliance 10, according to exemplary embodiments of the present disclosure. Generally, the oven appliance 10 defines a vertical direction V, a lateral direction L, and a transverse direction T. The vertical direction V, lateral direction L, and transverse direction T are mutually perpendicular and form an orthogonal direction system. As will be understood, the oven appliance 10 is provided by way of example only, and the present subject matter may be used in any suitable appliance. Thus, the present disclosure may be used with other oven, range, or oven appliance configurations (e.g., configurations that define multiple interior cavities for the receipt of food, include no interior cavities, or are otherwise different than the configuration shown in FIG. 1), as well as other suitable appliances, as would be understood in light of the present disclosure.

The oven appliance 10 includes an insulated cabinet 12 with an interior cooking chamber 14 defined by an interior surface of cabinet 12. The cooking chamber 14 is configured for the receipt of one or more food items 15 (FIG. 3) to be cooked. The oven appliance 10 includes a door 16 rotatably mounted to cabinet 12 (e.g., with a hinge—not shown). A handle 18 may be mounted to door 16 and may assist a user with opening and closing door 16 in order to access an opening to cooking chamber 14. For example, a user can pull on the handle 18 to open or close door 16 and access cooking chamber 14 through the opening. As would be understood, one or more internal heating elements (e.g., baking or broiling heating elements) may be provided within cooking chamber 14 to cook or otherwise heat items therein.

Figure 3:
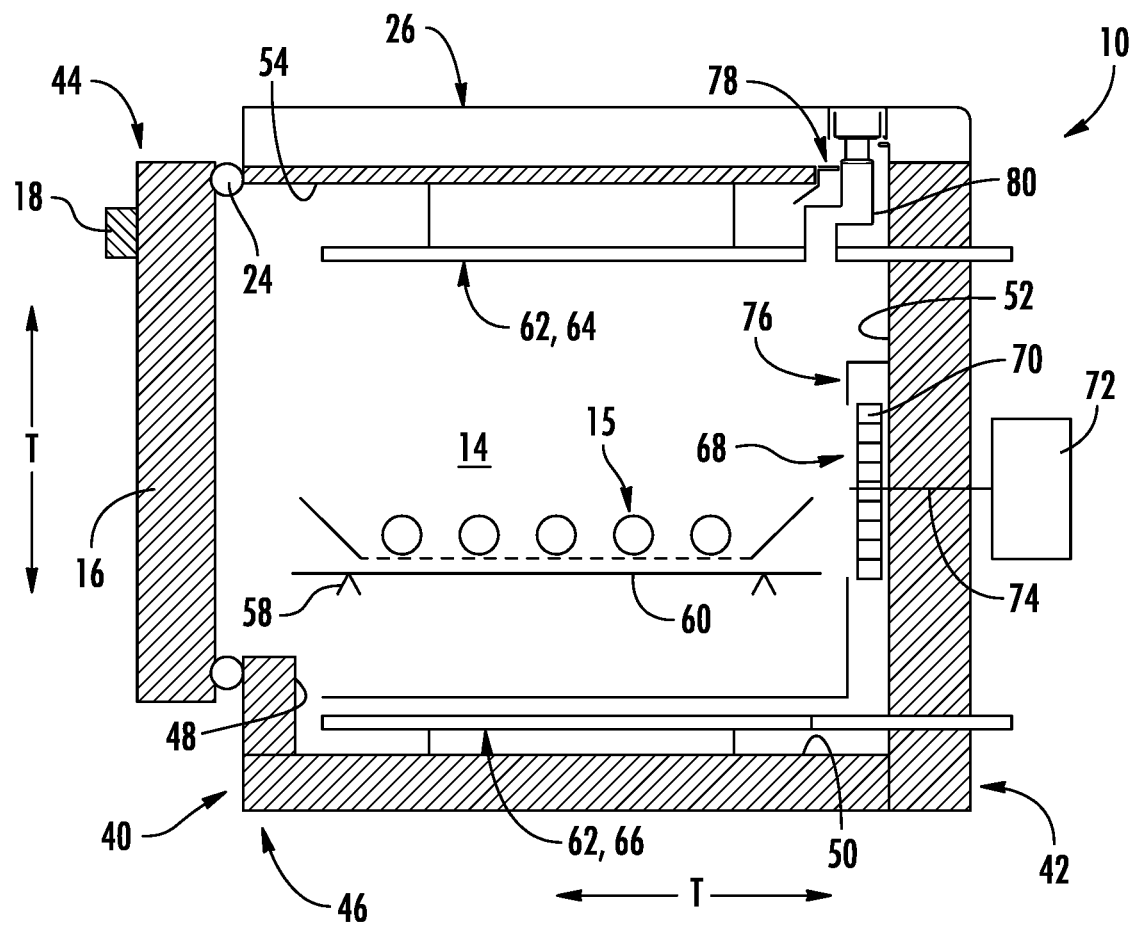
FIG. 3 provides a cross-sectional view of the oven appliance of FIG. 1.

Further, the oven appliance 10 can include a seal 24 (FIG. 3) between the door 16 and the cabinet 12 that assist with maintaining heat and cooking fumes within cooking chamber 14 when the door 16 is in a closed position, as shown in FIG. 1. One or more glass panes 20 provide for viewing the contents of cooking chamber 14 when door 16 is closed and assist with insulating cooking chamber 14. Optionally, as shown in FIG. 3, a baking rack 60 is positioned in cooking chamber 14 for the receipt of food items 15 or utensils containing food items 15.

Moreover, the oven appliance 10 may include a cooktop surface 26 having one or more heating elements 32 for use in heating or cooking operations. In exemplary embodiments, the cooktop surface 26 is comprised of a metal (e.g., steel) panel 28 on which one or more grates 30, described in further detail below, may be supported. In other embodiments, however, the cooktop surface 26 may be constructed of another suitable material, such as a ceramic glass or another suitable non-metallic material. In alternative embodiments, the oven appliance 10 may be a wall oven without the cooktop surface 26.

Further, the heating elements 32 may be various sizes, as shown in FIG. 1, and may employ any suitable method for heating or cooking an object, such as a cooking utensil (not shown), and its contents. In one embodiment, for example, the heating element(s) 32 may use a heat transfer method, such as electric coils or gas burners, to heat the cooking utensil. In another embodiment, however, the heating element(s) 32 uses an induction heating method to heat the cooking utensil directly. In turn, heating element may include a burner element, electric heat element, induction element, or another suitable heating element.

Some embodiments of the oven appliance 10 may further include a controller 22 (e.g., configured to control one or more operations of oven appliance 10). For example, the controller 22 may control at least one operation of the oven appliance 10 that includes an internal heating element or cooktop heating element 32 and/or the door 16. As such, the controller may be in communication (via for example a suitable wired or wireless connection) with the door 16 and/or one or more of heating element(s) 32, as well as any other suitable components of the oven appliance 10, as discussed herein. In general, the controller 22 may be operable to configure the oven appliance 10 (and various components thereof) for cooking. Such configuration may be based, for instance, on a plurality of cooking factors of a selected operating cycle or mode.

By way of example, the controller 22 may include one or more memory devices and one or more microprocessors, such as general or special purpose microprocessors operable to execute programming instructions or micro-control code associated with an operating cycle. The memory may represent random access memory such as DRAM, or read only memory such as ROM or FLASH. In one embodiment, the processor executes programming instructions stored in memory. The memory may be a separate component from the processor or may be included onboard within the processor.

In an embodiment, the controller 22 may be positioned in a variety of locations throughout the oven appliance 10. As illustrated, the controller 22 may be located within a user interface 34 of the oven appliance 10. In some such embodiments, input/output ("I/O") signals may be routed between the controller 22 and various operational components of the oven appliance 10, such as the door 16, the heating element(s) 32, control knobs 36, display component 37, sensors, alarms, or other components as may be provided. For instance, signals may be directed along one or more wiring harnesses that may be routed through cabinet 12. In some embodiments, the controller 22 is in communication with the user interface 34 and the control knobs 36 through which a user may select various operational features and modes and monitor progress of the oven appliance 10. In one embodiment, the user interface 34 may represent a general purpose I/O ("GPIO") device or functional block. In another embodiment, the user interface 34 may include input components, such as one or more of a variety of electrical, mechanical, or electro-mechanical input devices including rotary dials, push buttons, and touch pads. Further, the user interface 34 may include a display component 37, such as a digital or analog display configured to provide operational feedback to a user.

Figure 2:
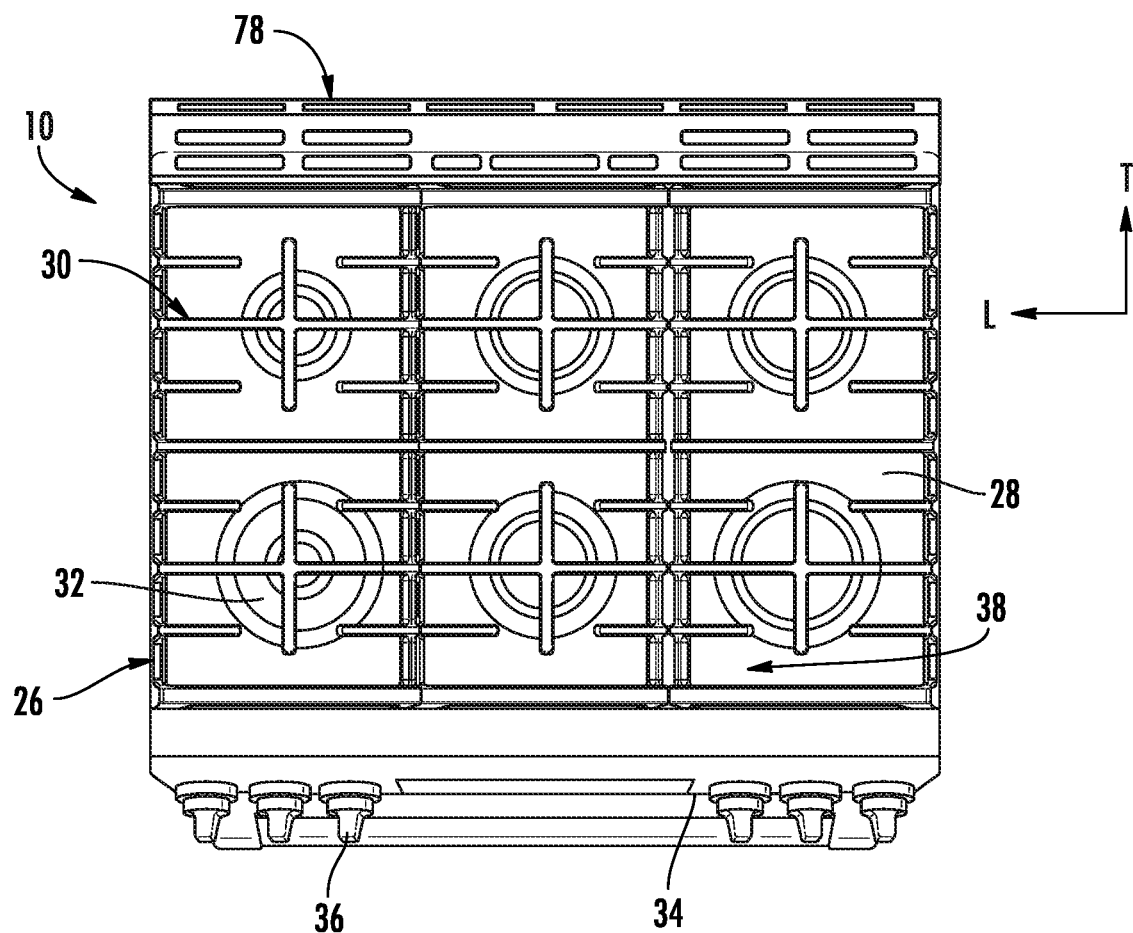
FIG. 2 provides a top view of the exemplary oven appliance of FIG. 1.

Referring now to FIG. 2, a top view of the oven appliance 10 of FIG. 1 is illustrated. As described above, the cooktop surface 26 may include a plurality of heating elements 32 and a panel 28. The panel 28 may be concave (e.g., downward along the vertical direction V) to form a depression or cavity 38 therein. Thus, the heating element(s) 32 may be provided within the cavity 38, and cooking grates 30 may be positioned over top of the heating element(s) 32 (e.g., along the vertical direction V). In this example, the cooktop surface 26 includes six heating elements 32. It should be noted that the disclosure is not limited to this, and the cooktop surface 26 may include fewer or more heating elements 32 as specific applications dictate. In some embodiments, one or more heating elements 32 may be located proximate an edge of panel 28, as will be described in more detail below.

In addition, as shown, the cooktop surface 26 may include one or more cooking grates 30 provided over the heating elements 32. As shown in FIG. 2, for example, the cooktop surface 26 may include three cooking grates 30. It should be noted that the disclosure is not limited to this, and the cooktop surface 26 may include fewer or more cooking grates 30 as specific applications dictate. Each cooking grate 30 may extend from a rear of panel 28 to a front of the panel 28 along the transverse direction. Additionally, or alternatively, the cooking grates 30 may be positioned adjacent to each other along the lateral direction L.

Referring now to FIG. 3, a schematic, cross-sectional view of the oven appliance 10 of FIG. 1 is illustrated. As shown, the cabinet 12 between a front 40 and a back 42 along a transverse direction T. The cabinet 12 further extends between a top 44 and a bottom 46 along a vertical direction V. Moreover, as shown in FIG. 3, the chamber 12 has interior walls including opposing sidewalls 56 (FIG. 1), front wall 48, bottom wall 50, back wall 52, and top wall 54 that define the cooking chamber 14. Bottom wall 50 and top wall 54 are spaced apart along the vertical direction V, and sidewalls 56 extend along the vertical direction V between top wall 54 and bottom wall 50. Back wall 52 extends between the sidewalls 56 along the horizontal direction and also extends between top wall 54 and bottom wall 50 along the vertical direction V.

In addition, as shown in FIG. 3, the sidewalls 56 may include supports 58 for supporting one or more oven racks 60 that may be selectively positioned within chamber 14. Further, as shown, heating elements 62 may be positioned at the top and the bottom of chamber 14 to provide heat for cooking and cleaning. More particularly, as shown, the heating elements 62 may include a first heating element 64 arranged adjacent to the bottom wall 50 and a second heating element 66 arranged adjacent to the top wall 54. Such heating element(s) 62 can be e.g., gas, electric, microwave, or a combination thereof. Other heating elements (not shown) could be located at other locations as well.

In another embodiment, the oven appliance 10 may be equipped with features for selectively generating a forced flow of heated air within the cooking chamber 14 (e.g., using a fan(s) as discussed in greater detail below). For example, still referring to FIG. 3, the oven appliance 10 may also include a fan assembly 68 having a fan blade 70, a motor shaft 74, and a fan motor 72. As such, the motor shaft 74 is configured to rotate the fan blade 70 about a fan axis. Further, as shown, a fan cover 76 may be arranged adjacent to the back wall 52 and at least partially covering the fan assembly 68. Further, as shown, the fan assembly 68 may be positioned adjacent to the back wall 52 of the oven appliance 10. In alternative embodiments, the fan assembly 68 may be located at any suitable location within the oven appliance and any suitable number of fan assemblies may be utilized. Accordingly, the fan assembly 68 is operable to cause air to flow in the chamber 14.

Figure 4:
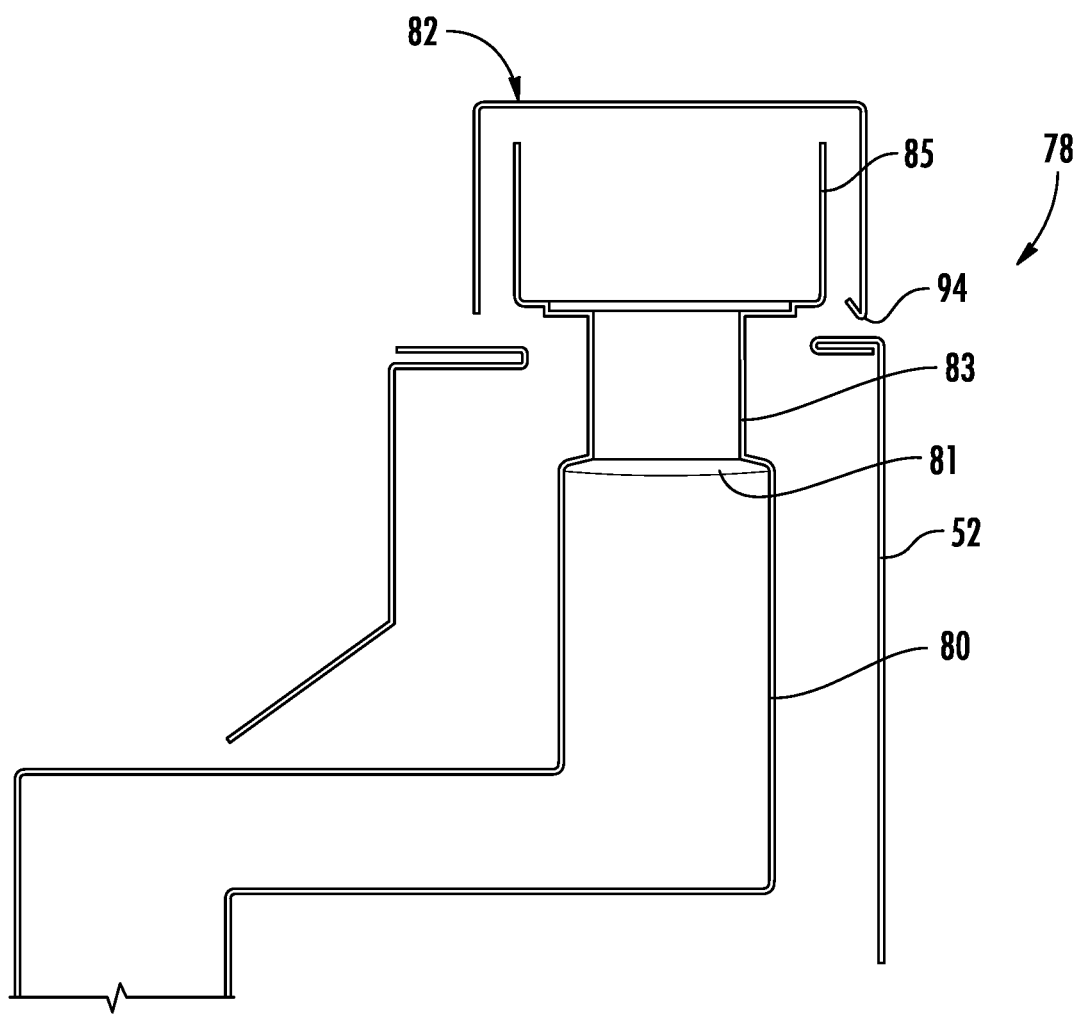
FIG. 4 provides a detailed, schematic view of the vent assembly of the oven appliance according to exemplary embodiments of the present disclosure.

In addition, as shown in FIGS. 2-4, the oven appliance 10 also includes a vent assembly 78 in fluid communication with the chamber 14 for directing airflow from within the chamber 14 to outside of the chamber 14. More specifically, as shown in FIGS. 3 and 4, the vent assembly 78 includes a vent 80 and a vent cover 82 arranged atop the vent 80. Optionally, in particular embodiments, the vent assembly 78 may also include a vent extension 83 arranged above a top opening 81 of the vent 80. In addition, as shown, the vent assembly 78 may also include a spill guard 85 arranged above the vent extension 83 and below the vent cover 82. In such embodiments, as an example, the spill guard 85 is received within the vent cover 82.

Figure 5:
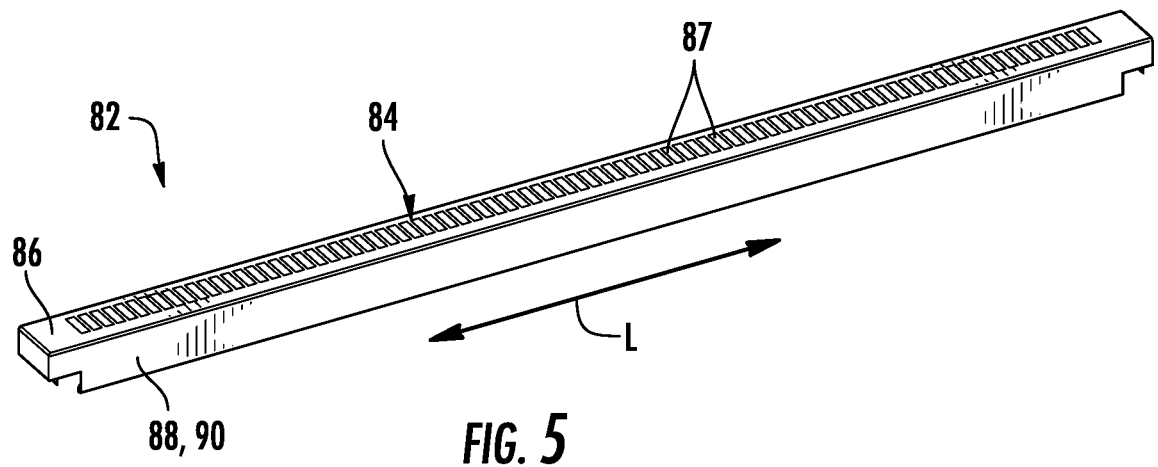
FIG. 5 provides a back, perspective view of the vent cover of the vent assembly of the oven appliance according to exemplary embodiments of the present disclosure.
Figure 6:
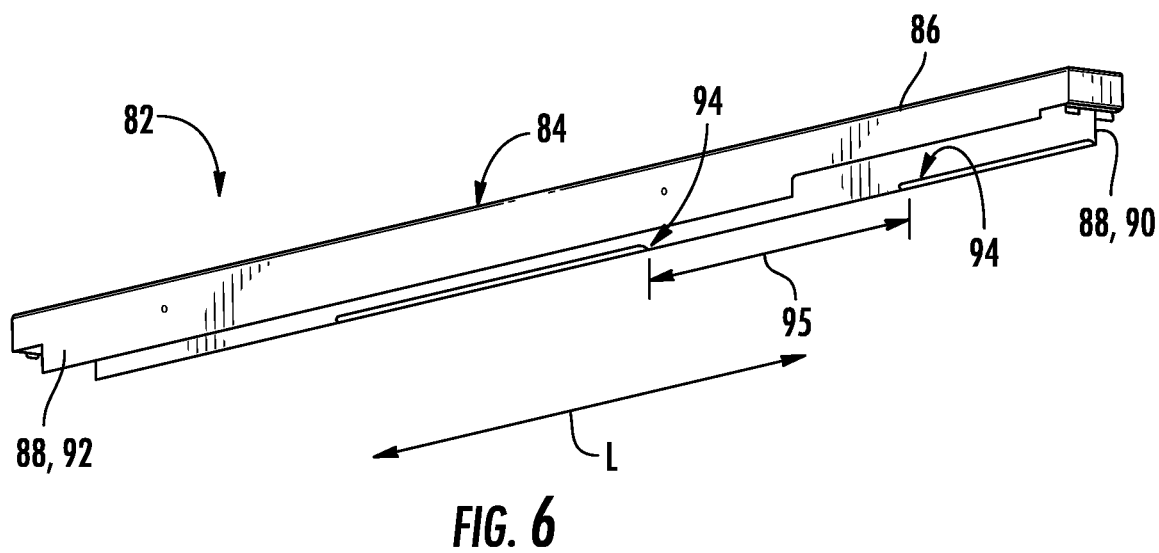
FIG. 6 provides a front, perspective view of the vent cover of the vent assembly of the oven appliance according to exemplary embodiments of the present disclosure.
Figure 7:
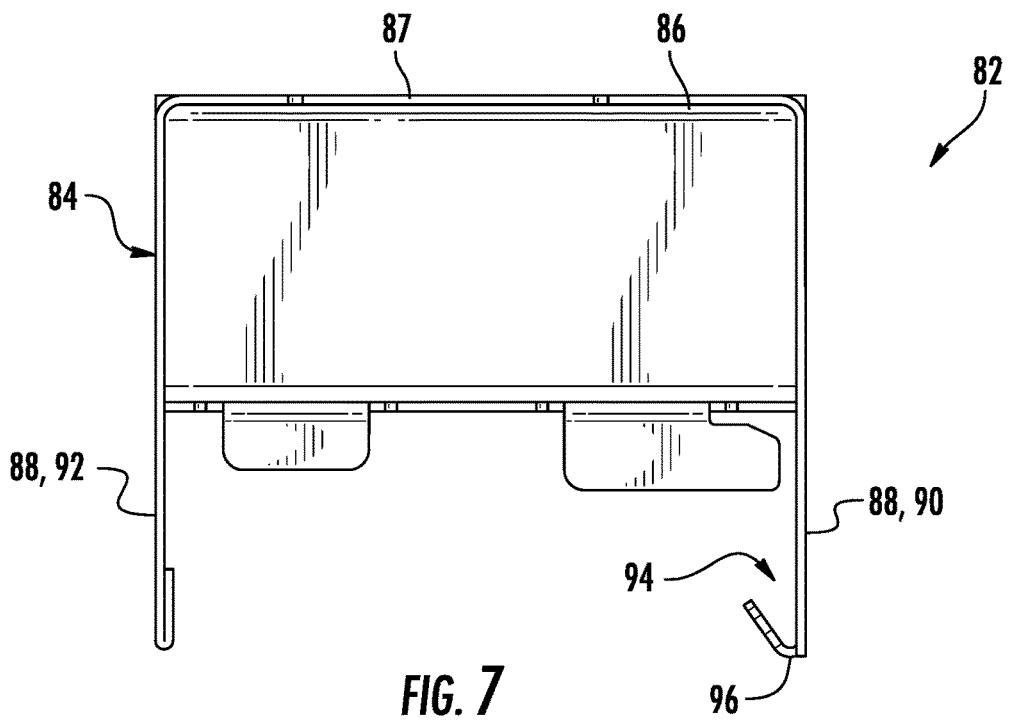
FIG. 7 provides a front view of the vent cover of the vent assembly of the oven appliance according to exemplary embodiments of the present disclosure.

Referring now to FIGS. 5-7, the vent cover 82 includes a body 84 defining a cover portion 86 with a plurality of apertures 87 for directing airflow from within the chamber 14 through the vent 80 and outside of the chamber 14. Furthermore, as shown, the body 84 of the vent cover 82 also includes at least one flange 88. In certain embodiments, as shown particularly in FIG. 7, the body 84 may include opposing flanges 88. In alternative embodiments, the cover portion 86 may include a single flange. In addition, as shown, the opposing flanges 88 may include a first flange 90 and a second flange 92. Thus, as shown in the illustrated embodiment, the first flange 90 may be arranged on a first side of the cover portion 86 and the second flange 92 may be arranged on an opposite side of the cover portion 86.

Moreover, as shown in FIGS. 6 and 7, one or more of the flanges 88 may include at least one trough 94 for collecting condensed liquid therein. In an embodiment, as shown in FIGS. 4 and 7 for example, the trough(s) 94 may be integral with first flange 90. Further, in an embodiment, as shown in FIG. 4, the trough(s) 94 may be arranged adjacent to the back wall 52 of the oven appliance 10.

Figure 8A:
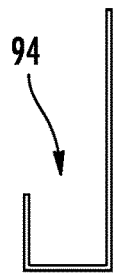
FIGS. 8A-8F provides a front view of various shapes of the trough of the vent cover of the vent assembly of the oven appliance according to exemplary embodiments of the present disclosure.
Figure 8B:
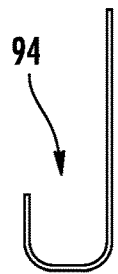
Figure 8C:
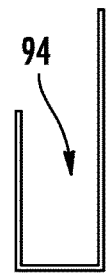
Figure 8D:
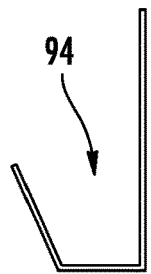
Figure 8E:
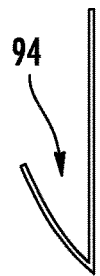
Figure 8F:
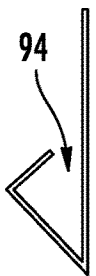

In certain embodiments, the trough(s) 94 may be formed by bending an end of the first flange 90 upwards. In another embodiment, as shown in FIGS. 8A-8E, the trough(s) 94 may have any one of the following cross-sectional shapes: square (FIG. 8A), curved or U-shaped (FIG. 8B), rectangular (FIG. 8C), trapezoidal (FIG. 8D), V-shaped (FIG. 8E), or triangular (FIG. 8F). It should be further understood that any other suitable shape may also be within the spirit and scope of the invention.

Furthermore, as shown particularly in FIG. 7, in an embodiment, the trough(s) 94 forms a bottom-most edge 96 of the vent cover 82.

In several embodiments, as shown particularly in FIG. 6, either of the flanges 88 may include a plurality of troughs 94. For example, as shown, the first flange 90 includes two troughs 94. In such embodiments, as shown in FIG. 6, each of the plurality of troughs 94 are spaced apart from each other by a gap 95 along a length L of the vent cover 82. Moreover, in such embodiments, each of the plurality of troughs 94 is configured to align with an area of the oven appliance 10 containing an electrical component so as to prevent the condensed liquid from reaching such areas.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance, comprising:
   a cabinet having a chamber positioned within the cabinet, the chamber configured for receipt of a food item for cooking;
   a door for providing selective access to the chamber;
   a plurality of walls comprising a top wall, a bottom wall, a back wall, a front wall, and opposing sidewalls defining the chamber;
   a heating element for heating and cooking the food item; and
   a vent assembly for directing airflow from within the chamber outside of the chamber, the vent assembly comprising a vent and a vent cover arranged atop the vent, the vent cover comprising a body defining a cover portion and at least one flange formed by bending an end of the vent cover towards the vent, the at least one flange defining at least one trough extending from an inner surface of the vent cover and a bend, the at least one trough configured for collecting condensed liquid therein, wherein the bend defines a bottom-most end of the vent cover, wherein the at least one flange forms a continuous barrier between the cover portion and the bend, and wherein the at least one trough is aligned vertically above an electrical component of the oven appliance so as to prevent the condensed liquid from reaching the electrical component.

2. The oven appliance of claim 1, wherein the at least one trough is integral with the at least one flange.

3. The oven appliance of claim 1, wherein the at least one trough comprises one of the following cross-sectional shapes: V-shaped, U-shaped, square, triangular, rectangular, or trapezoidal.

4. The oven appliance of claim 1, wherein the at least one trough is arranged adjacent to the back wall of the oven appliance.

5. The oven appliance of claim 1, wherein the at least one flange further comprises a plurality of troughs, the at least one trough being one of the plurality of troughs.

6. The oven appliance of claim 5, wherein each of the plurality of troughs are spaced apart from each other by a gap along a length of the vent cover.

7. The oven appliance of claim 1, wherein the vent assembly further comprises a vent extension arranged above a top opening of the vent.

8. The oven appliance of claim 7, wherein the vent assembly further comprises a spill guard arranged above the vent extension and below the vent cover.

9. The oven appliance of claim 8, wherein the spill guard is received within the vent cover.

10. A vent assembly for an oven appliance, the vent assembly comprising:
- a vent for directing airflow from within a chamber of the oven appliance outside of the chamber;
- a spill guard arranged above the vent; and
- a vent cover arranged atop the vent and the spill guard and at least partially covering the spill guard, the vent cover comprising a body defining a cover portion and at least one flange formed by bending an end of the vent cover towards the vent, the at least one flange defining at least one trough extending from an inner surface of the vent cover and a bend, the at least one trough configured for collecting condensed liquid therein, wherein the bend defines a bottom-most end of the vent cover, wherein the at least one flange forms a continuous barrier between the cover portion and the bend, and wherein the at least one trough is aligned vertically above an electrical component of the oven appliance so as to prevent the condensed liquid from reaching the electrical component.

11. The vent assembly of claim 10, wherein the at least one trough is integral with the at least one flange.

12. The vent assembly of claim 10, wherein the at least one trough comprises one of the following cross-sectional shapes: V-shaped, U-shaped, square, triangular, rectangular, or trapezoidal.

13. The vent assembly of claim 10, wherein the body comprises opposing flanges, the at least one flange being a first flange of the opposing flanges, the first flange arranged on a first side of the cover portion and a second flange of the opposing flanges being arranged on an opposite side of the cover portion.

14. The vent assembly of claim 10, wherein the at least one flange further comprises a plurality of troughs, the at least one trough being one of the plurality of troughs.

15. The vent assembly of claim 14, wherein each of the plurality of troughs are spaced apart from each other by a gap along a length of the vent cover.

16. The vent assembly of claim 10, wherein the vent assembly further comprises a vent extension arranged above a top opening of the vent.

* * * * *